(12) United States Patent
Bishop et al.

(10) Patent No.: US 7,180,652 B2
(45) Date of Patent: Feb. 20, 2007

(54) MARS OPTICAL MODULATORS

(75) Inventors: David John Bishop, Summit, NJ (US);
Keith Wayne Goossen, Howell, NJ (US); Dennis S. Greywall, Whitehouse Station, NJ (US); James Albert Walker, Howell, NJ (US)

(73) Assignees: Lucent Technologies Inc., Murray Hill, NJ (US); Agere Systems Inc., Allentown, PA (US)

( * ) Notice: Subject to any disclaimer, the term of this patent is extended or adjusted under 35 U.S.C. 154(b) by 0 days.

(21) Appl. No.: 11/060,870

(22) Filed: Feb. 18, 2005

(65) Prior Publication Data

US 2005/0225835 A1 Oct. 13, 2005

Related U.S. Application Data

(63) Continuation of application No. 09/841,332, filed on Apr. 24, 2001, now abandoned.

(51) Int. Cl.
*G02B 26/00* (2006.01)

(52) U.S. Cl. ............... 359/291; 359/224; 359/295; 359/298; 359/350; 359/847

(58) Field of Classification Search ........ 359/290–292, 359/295, 298, 350, 847, 224
See application file for complete search history.

(56) References Cited

U.S. PATENT DOCUMENTS

| | | | | |
|---|---|---|---|---|
| 4,203,128 | A * | 5/1980 | Guckel et al. | 331/156 |
| 5,629,790 | A * | 5/1997 | Neukermans et al. | 359/198 |
| 6,433,411 | B1 * | 8/2002 | Degani et al. | 257/678 |
| 6,515,791 | B1 * | 2/2003 | Hawwa et al. | 359/323 |

* cited by examiner

*Primary Examiner*—Evelyn A. Lester

(57) ABSTRACT

The specification describes an improved Moving Anti-Reflection Switch (MARS) device structure that largely eliminates charge build up on the movable membrane, and reduces stresses that cause curling of the membrane. The improved device uses a movable membrane made of single crystal silicon.

7 Claims, 7 Drawing Sheets

MARS OPTICAL MODULATORS

RELATED APPLICATIONS

This application is a Continuation of application Ser. No. 09/841,332 abandoned, and claims the benefit of the filing date of that application, Apr. 24, 2001.

FIELD OF THE INVENTION

The invention relates to Moving Anti-Reflection Switch (MARS) devices.

BACKGROUND OF THE INVENTION

Surface-normal optoelectronic devices, i.e. those for which the flow of light is perpendicular to the surface of the device, are typically less expensive to produce and package than waveguide devices in which the flow of light is parallel to the device surface. Testing of surface-normal devices can be performed easily at the wafer level, increasing yield and reducing cost. In packaging, alignment tolerance is favorable due to the relatively large optical windows of surface-normal devices in comparison with the small thickness of active layers in planar waveguide devices, or compared to the core diameter of optical fibers. For lasers, the emitted optical mode may be circular, which adapts well to the core of an optical fiber, and makes vertical cavity surface emitting lasers more attractive. Finally, surface-normal devices may be easily arranged in arrays for multi-fiber connections, or for displays such as liquid crystal displays.

The need for surface-normal optical modulators, e.g., those in which optical reflectivity may be modulated by an electrical signal, arose with proposals of fiber-to-the-home systems based on recirculation of light from the home to the central office. Typically, these proposals are for wavelength multiplexed passive systems which utilize an optical modulator at the subscriber location to replace the active LED or laser devices proposed in prior art systems. See, for example, L. Altwegg, A Azizi, P. Vogel, Y. Wang, and P. Wiler, "LOCNET—a fiber-in-the-loop system with no light-source at the subscriber end", *J. of Lightwave Tech.*, vol. 12, no. 3, pp. 535–540, 1994; also see: N. J. Frigo, P. D. Magill, T. E. Darcie, P. P. Iannone, M. M. Downs, B. N. Desai, U. Koren, T. L. Koch, C Dragone, and H. M. Presby, "RITE-Net: A passive optical network architecture based on the remote interrogation of terminal equipment," *Proc. of the Optical Fiber Conference—post deadline session*, (San Jose, Calif., Feb. 20–25, 1994) pp. 43–47. This approach has several advantages, among them lower cost and higher reliability. The passive devices are also less sensitive to temperature variations, and have a robustness suitable for the uncontrolled environment at some customer locations. Additionally, wavelength routing in the network is more reliable since the upstream light is identically the same wavelength as the downstream light. It also allows easier diagnostics of failures in the system. With a customer based light source system, if the central exchange ceases receiving signals from the customer location, the cause can be either be a breakdown of the customer's laser or a fiber break. With a recirculating system, the cause can only be in transmission, i.e. a fiber break.

A significant advantage of a recirculated system is that it can be multiplexed with several wavelengths (wavelength division multiplexing, WDM), thus increasing capacity. WDM offers attractive system flexibility since in the field a passive optical device, such as a wavelength grating router, may direct each particular wavelength to a particular home. For a typical fiber-to-the-home system, a single fiber may be strung to multiple customer locations, and a high bandwidth common channel serves all of those customers. It is also generally believed that the splitter that separates the individual signals from the common channel should be passive to reduce cost and increase reliability of the system. In a bidirectional system, a passive splitter also functions as a signal combiner for signals from the customer to the central exchange (upstream). If the customer location is provided with a laser source, as in a non-recirculating system, that laser must be an expensive single frequency device with precisely controlled output, and controlled environment, to match the wavelength assigned to the downstream signal. However, this function is relatively simple in a WDM recirculating system since the upstream wavelengths are inherently precisely the same as the downstream wavelengths.

Therefore, it is evident that recirculating systems are preferable for versatile WDM systems. In these systems, there is a need for an inexpensive, robust modulator that operates over a range of wavelengths and, for reasons explained above, is a surface-normal device. There is a need in the art for surface-normal optical modulators with response times shorter than 10 μs, and with high contrast ratio and wide optical bandwidth.

To meet these needs, a low-cost silicon optical modulator has been developed based on micro electro mechanical systems principles (MEMS). The device has been designated MARS, for Moving Anti-Reflection Switch. This device has a movable conductive membrane suspended over a conductive substrate. With an appropriate electrostatic field the membrane is controllably moved toward, or away from, the substrate thus producing a precisely controlled air gap between the membrane and the substrate. With proper positioning of the membrane with respect to the substrate the MARS device can be switched from a reflecting state to an anti-reflecting state. For more details of the basic MARS device see K. W. Goossen, J. A. Walker, and S. C. Arney, "Silicon modulator based on Mechanically-Active Anti-Reflection layer with 1 Mbit/sec capability for fiber-in-the-loop applications, "*IEEE Phot. Tech. Lett.*, vol. 6, pp. 1119–1121, Sep. 1994.

The basic MARS structure is made by forming an approximately 1 mm-thick film of phosphosilicate glass (PSG) on a silicon substrate and an approximately 0.2 mm-thick film of silicon nitride on top of the PSG. The nitride film forms the movable conductive membrane and the silicon substrate forms the conductive substrate. Details of the MARS structure and its fabrication can be found in U.S. Pat. No. 5,500,761. Much of the PSG layer is sacrificial, i.e. after the silicon nitride layer is formed part of the PSG layer that is between the silicon nitride layer and the silicon substrate, is etched away leaving a portion the silicon nitride "floating", resulting in the air gap that allows movement of the silicon nitride layer with respect to the silicon substrate. Composite polysilicon/silicon nitride/polysilicon films can also be used to advantage for the movable membrane. See U.S. Pat. No. 5,654,819, which is incorporated herein by reference for the details of that MARS structure and for the spatial relationships that define the MARS elements. Advantages of the MARS device are ease of fabrication, which leads to low manufacturing cost, wide spectral bandwidth, and high speed. Disadvantages of the MARS structures include charging of the suspended silicon nitride membrane (especially when used alone, i.e. without polysilicon coatings), and residual stress in the membrane itself, which can lead to undesirable deformation or curling. Membranes with double support beams, such as those used in channelized spectral equalizers, are particularly susceptible to lateral curling. This results in large dead zones in the membrane which functionally produces large unwanted pass bands in the optical signal.

SUMMARY OF THE INVENTION

We have developed an improved MARS device structure that largely eliminates charge build up on the movable membrane, and reduces stresses that cause curling of the membrane. The vitalizing feature of the improved device is the use of a movable membrane made of single crystal silicon. We have also developed a technique for fabricating a multi-channel equalizer based on this new MARS structure.

DETAILED DESCRIPTION

Figure 1:
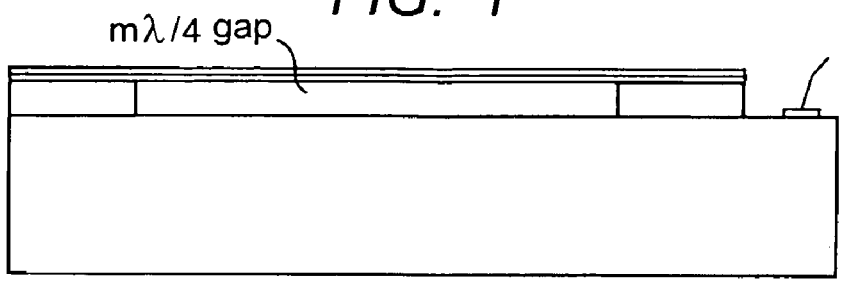
FIG. 1 is a schematic representation of the operation of a moving anti-reflection switch or MARS device showing the reflection state of the switch.

The operating principle of the MARS device is based on the change in an air gap between a suspended membrane, e.g. a silicon nitride film, and the underlying substrate as seen in FIG. 1. In a conventional MARS device the membrane has a refractive index equal to the square root of the refractive index of the substrate, and a thickness equal to ¼ of the wavelength of the incident light $\lambda$. The membrane is suspended by a web comprising the optically active film, i.e. the silicon nitride film, and metallization on the top side of the film. In some embodiments the metallization is selectively applied to leave a window for the optical beam.

In the most fundamental case, if the air gap is equal to zero (contact with the substrate), a typical anti-reflection condition is achieved. If the nitride film is suspended above the substrate by an air gap equal to $\lambda/4$ however, a high reflection (>70%) condition is achieved. As could be expected, this relationship would hold for any value of $m\lambda/4$ (m even—anti-reflecting, m odd—reflecting). For a typical MARS device, an initial air gap of $3\lambda/4$ is used to avoid stiction problems during operation and enhance the lifetime of the devices.

Figure 2:
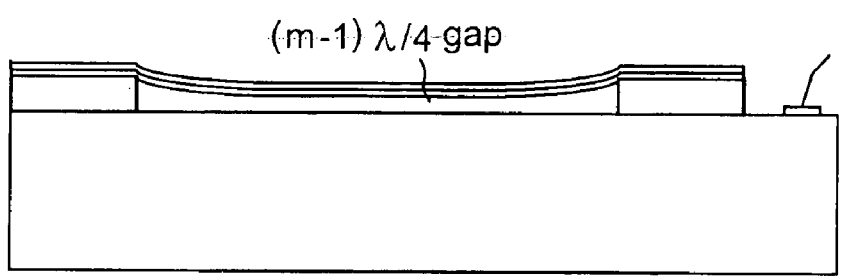
FIG. 2 is a representation similar to that of FIG. 1 showing the switch in the anti-reflecting state.

The reflecting state is illustrated in FIG. 1 and the anti-reflecting state is illustrated in FIG. 2. The movable membrane is shown in these figures as a two layer structure. In some known embodiments of the MARS structure the flexible membrane comprises a three layer structure with the optically active layer sandwiched between conductive films. These embodiments represent conventional prior art structures. The conductive films are typically polysilicon or amorphous silicon. This MARS structure is often referred to as a double-poly MARS device, and is described and claimed in U.S. Pat. No. 5,654,819, issued Aug. 5, 1997. The MARS device may be designed with any membrane with a reflectivity that matches that of the substrate at some air gap. This is typically silicon nitride, $SiN_x$, but other materials, e.g. $SiO_xN_y$, with suitable refractive indices, have been substituted.

Figure 3:
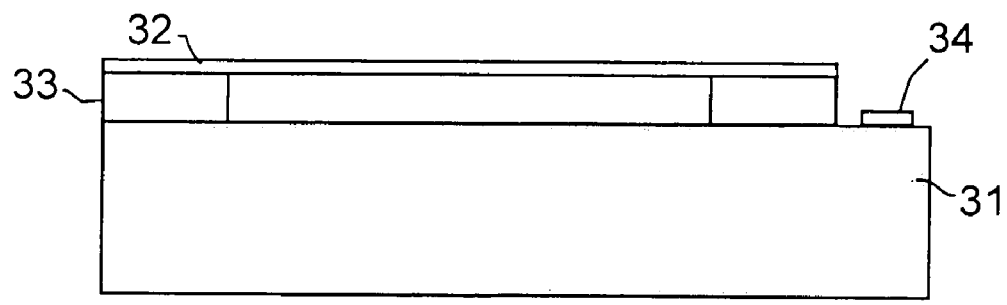
FIG. 3 is a schematic view of the improved MARS device structure according to the invention.

In the improved structure of the invention, illustrated schematically in FIG. 3, the membrane comprises single crystal silicon. In FIG. 3, a silicon substrate is shown at 31 with the single crystal silicon membrane comprising active optical layer 32. In contrast to the prior art device described earlier, using a silicon nitride membrane, no metallization is required on the membrane. However, a choice of having metallization for greater conductivity, or to tune the finesse of the device, is optional. The intermediate dielectric support structure is shown at 33, and substrate contact at 34.

Figure 4:
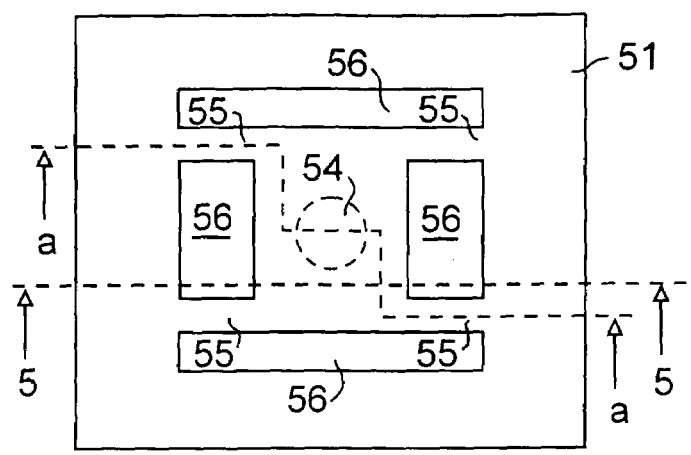
FIG. 4 is a topographical view of a typical embodiment of the device of FIG. 3.

A plan view of a typical MARS device configuration, in which the movable membrane is single crystal silicon, is shown in FIG. 4. The section a-a is the view shown in FIGS. 1–3. The sectional views used for FIGS. 1–3, which are not to scale, illustrate the basic electrostatic mechanism for the MARS device. The overall device structure appears in FIG. 4, where the single crystal silicon membrane layer is shown at 51. The optically active region is where beam 54 is incident on the MARS structure. Openings through the membrane structure are formed where the substrate 56 is visible. These openings form the weblike structure that suspends the single crystal silicon active optical region over the air gap. In the geometry shown, there are four arms 55 supporting the flexible window. Other support arrangements can be used. For example, the membrane may be supported with three, or even two, support arms, or more than four if desired. Or, the membrane may be circular and continuously supported around its edge. See U.S. Pat. No. 5,751,469 issued May 12, 1998. In this embodiment the device may have an array of holes arranged on hexagonally spaced centers and suitable spacing, e.g. 3 micron holes and 10 microns center to center.

Figure 5:
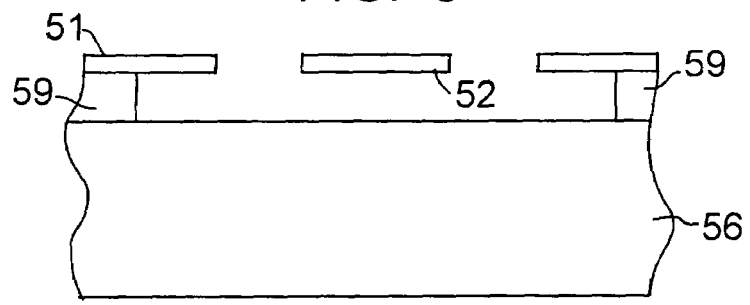
FIGS. 5 is a sectional view through 5—5 of FIG. 4.

FIG. 5 shows a section 5—5 through FIG. 4 as indicated. The single crystal silicon layer 51 is shown with membrane portion 52 thereof suspended to form the active element of the device. The thick intermediate dielectric standoff layer 59 is visible in FIG. 5, and its thickness determines the spacing between the silicon substrate 56 and the optically active membrane 52.

The geometry shown in FIGS. 4 and 5 is typical for a device operating in the 1–2 Mbit/sec range. In this particular embodiment the mechanically active area may consist of a 30 μm×30 μm plate suspended by 50 μm-long arms 55. The active area where on which optical beam 54 is incident is typically 400–500 μm². Suitable low cost packages for these devices are described and claimed in U.S. Pat. No. 5,647,044.

The MARS devices described here are based on micro electro mechanical systems principles that use surface micromachining techniques to form thin film microstructures. An advantage of these techniques is the batch fabrication of several thousand chips at a time, making the cost per chip extremely low (a few cents per chip).

In the device represented by FIGS. 4 and 5, coatings may be added to the substrate to increase the finesse of the device. Coatings may also be added to the movable membrane to adjust device parameters in a known fashion.

A wide variety of MARS devices are known in the art. It is expected that any of these structures, including those described above, may take advantage of the invention, i.e. the use of a single crystal silicon membrane. A description of a suitable process for making a MARS device with a single crystal membrane will now be described in the context of fabricating another kind of MARS device, in this case a WDM multi-channel equalizer. Since the MARS device of the invention, with a single crystal movable membrane, will typically have narrow spectral behavior, it is well suited for applications such as channel equalizers where each element in the array can be individually biased for optimal performance in its wavelength band. However, it will be understood that this method is given by way of example only, and does not convey any limitation on the invention used in other device contexts.

Figure 6:
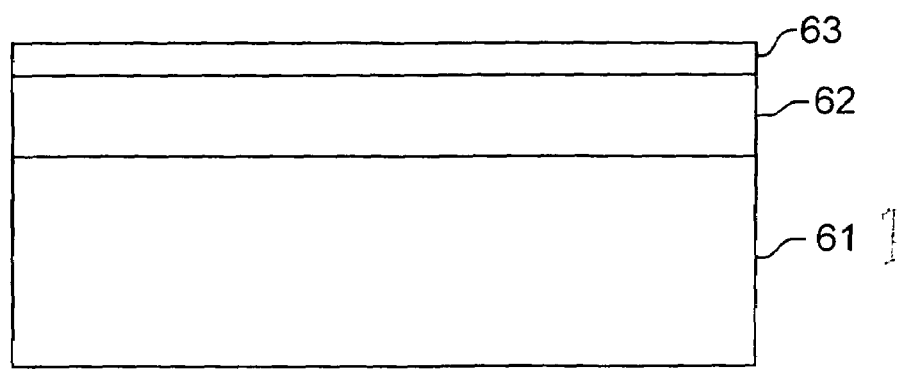
FIGS. 6–14 are schematic representations of process steps useful in fabricating a preferred embodiment of the improved MARS device of the invention.

FIG. 6 shows the starting structure for the multi-channel equalizer MARS device. It is a layered substrate with base support 61, intermediate insulating layer 62, and single crystal semiconductor layer 63. It will be understood that this type of MARS device is typically fabricated in a large array. The substrate shown in the figures is intended to represent a portion of a larger wafer being processed. Also, it will be evident to those skilled in the art that the drawings are not to scale and some elements may be exaggerated for clarity in illustration.

The structure of FIG. 6 is described as the starting structure because it represents the well known SOI substrate widely used, and readily available commercially, for integrated circuit (IC) manufacture. In the usual IC application, the insulating layer, typically $SiO_2$, is an essential component of the finished device, and functions in the device as the primary isolating layer. By way of contrast, the oxide layer in the structure and process proposed here, is largely sacrificial. It is a purely mechanical component, used to set the standoff of the movable membrane from the substrate in the finished structure.

A brief background of the development of the SOI substrate, and a description of its preparation, follows.

Workers in the art have envisioned a process in which a single semiconductor crystal could be "sliced" in some way to form very thin layers of semiconductor with high crystal perfection. However, both a technique for slicing thin layers, and a method for handling the thin layers after slicing, have not been developed until recently.

A successful technique for physically separating a thin layer from a single crystal semiconductor surface, and affixing the layer to another substrate, is described in U.S. Pat. No. 5,374,564, issued Dec. 20, 1994 to Michel Bruel. That patent describes a technique for ion implanting a gaseous exfoliating layer below the surface of a single crystal semiconductor substrate, and effectively cleaving the layer above the exfoliating layer off the substrate surface. We describe this technique as ion implantation cleavage, or IIC. By affixing another substrate to the surface of the original substrate, after the implantation step but prior to the cleaving step, the thin layer can effectively be transferred from the original substrate to a transfer (receiving) substrate. If the transfer substrate is insulating, or the surface of either the transfer substrate or the cleaved layer is insulating, a thin single crystal layer with an underlayer of dielectric material can be produced.

The cleaved layer in the aforementioned process may be formed by implanting hydrogen to form a gas layer of hydrogen beneath the semiconductor surface. On heating the semiconductor, the implanted hydrogen ions, combine and coalesce to form bubbles of hydrogen gas. These accumulate in a stratum at the implantation depth, and eventually cause a sufficient number of silicon bonds to break and thus free the surface layer from the substrate. Other inert ions such as helium, neon, krypton and xenon, either singly or in combination, may be used to form the implanted bubble layer.

The technology for the manufacture of SOI devices is well established and SOI substrates are available commercially. More details on the manufacture of these substrates is given in U.S. Pat. No. 5,953,622 issued Sep. 14, 1999, and 6,211,041, issued Apr. 3, 2001. These patents are incorporated herein by reference for those details. However, it will be understood that production of the SOI substrate forms no part of the present invention.

Figure 7:
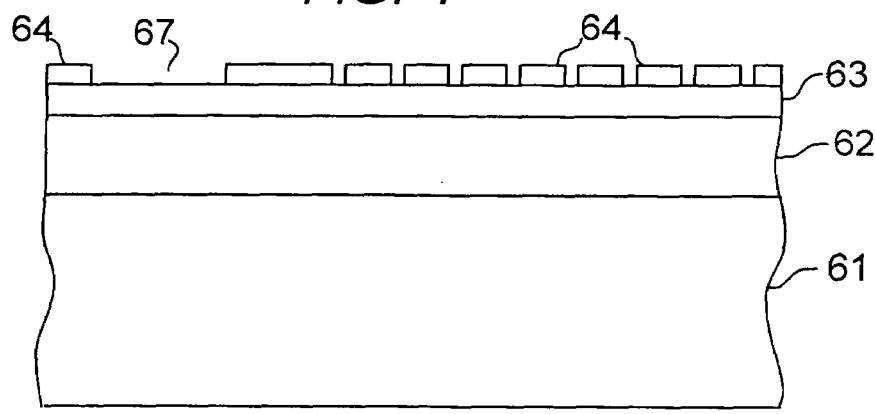
Figure 8:
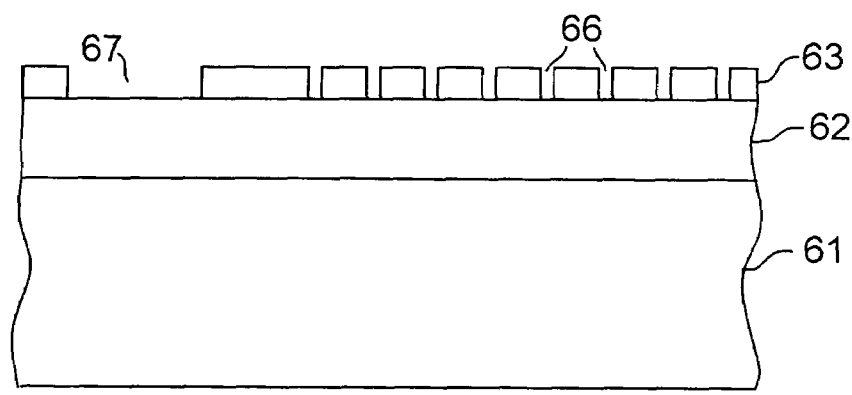
Figure 9:
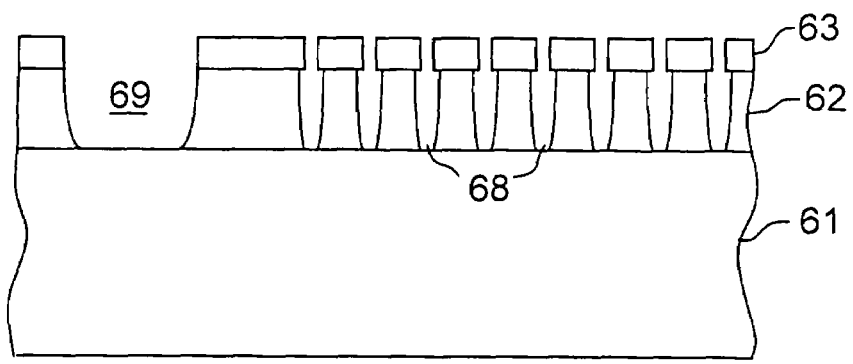

SOI substrates recommended for the invention comprise a 0.01–0.2 Ω-cm resistivity silicon wafer, a 0.05–2.0 µm $SiO_2$ layer, and a 0.1–0.3 µm single crystal silicon top layer. With reference to FIG. 7, the top silicon layer 63 is masked with a standard lithographic mask 64 for the purpose of defining separate movable membrane devices for each WDM channel. Seven channels, and a portion of an eighth, are formed in this sequence. The figures are cut away at the right to indicate that as many channels as desired can be fabricated for this device. The formation of these will become evident as the process proceeds. The mask is also provided with a relatively larger opening 67 which defines a substrate contact in a manner that will become apparent. Layer 63 may be etched using RIE or other suitable etch technique to produce the structure shown in FIG. 8, with openings 66 through the silicon layer. These opening are rectangular slots, as seen in the plan view of FIG. 12, and define individual movable membrane sections that are capable of independent MEMS operation. Mask 64 is shown removed in FIG. 8 but it may be retained through the etch sequence if desired. The next etch step is to etch grooves 68 in the underlying oxide layer as shown in FIG. 9. These grooves are intended to facilitate the release step in which the oxide under the movable membranes is completely removed. The grooves may be etched using RIE or using a wet etch, e.g. HF. During this etch step, a contact window 69 is cleared to the substrate 61 to accommodate a substrate contact. The contact window may be a circular feature as shown in FIG. 12.

Figure 10:
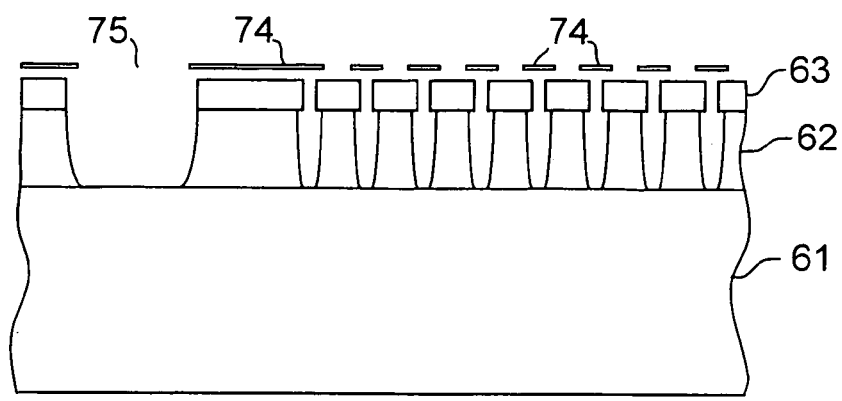

Referring to FIG. 10 a suitable mask 74 is applied over the top layer. The mask 74 may be a shadow mask or contact mask, and is used for localized deposition of the contacts that control the individual movable membranes. Mask 74 also has opening 75 registered to the contact window so that the substrate contact is formed at the same time. A suitable contact material, which may be evaporated (or sputtered) through the openings in the mask by known techniques, is chrome/gold. The individual contacts to control the individual membranes are shown at 78 in FIG. 11. The contact metal is evaporated though opening 75 to form substrate contact 76.

Figure 11:
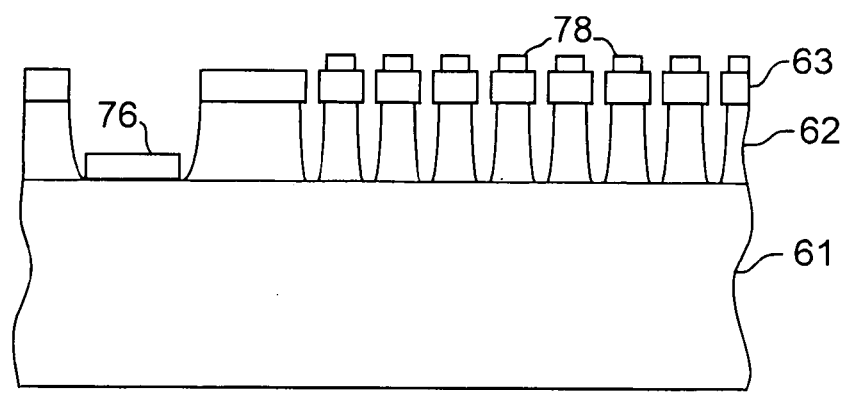
Figure 12:
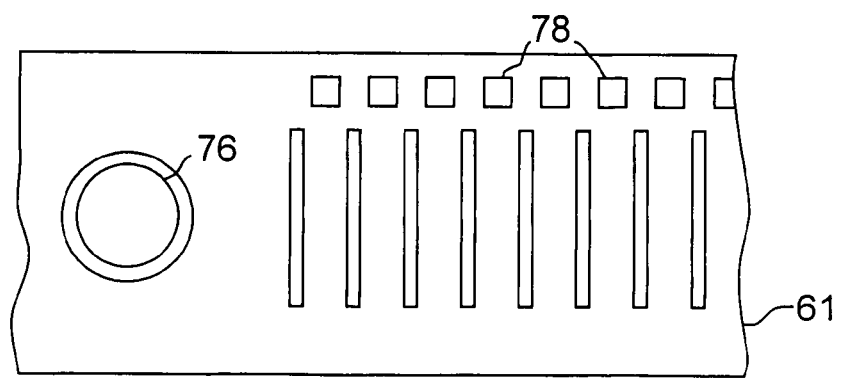

The structure shown in FIG. 11 can be seen in plan view in FIG. 12.

Figure 13:
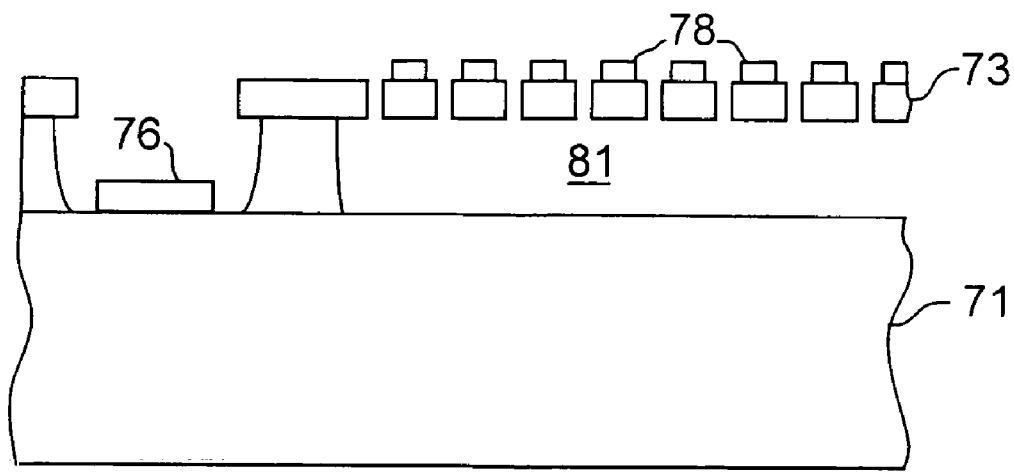

It may be evident to those skilled in the art that the step of releasing the movable membrane in this step sequence is deliberately delayed to allow the process steps for forming the contacts, i.e. the masking step and the metal deposition step, to be performed on a relatively robust substrate. With most of the processing and handling complete, the release step may be performed to produce the suspended membrane. This is illustrated in FIG. 13, where the remnants of the oxide layer that occupied region 81 beneath the individual membranes are shown etched away to release the membranes and allow them to freely deflect under the influence of fields applied by the individual control electrodes 78. A wet etch is used for this step, using an HF based etchant. The advantage of the etch step shown in FIG. 9 is now apparent. Etching the slots through the oxide layer allows etching to proceed rapidly, and primarily laterally, so the etch step to release the membranes has significantly reduced severity. The undercut at the device perimeter, where the oxide layer needs to be retained for support of the membrane layer, is minimized.

Figure 14:
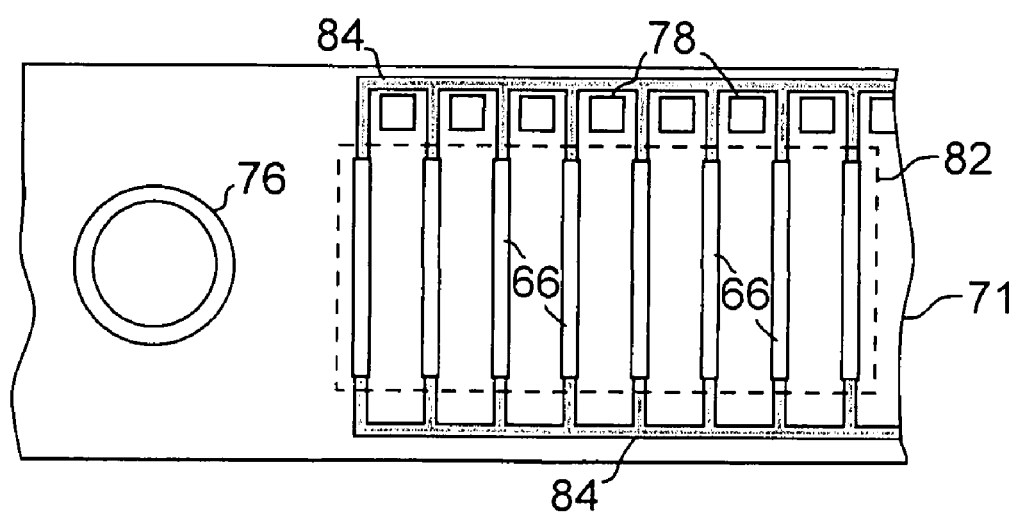

The individual membranes are electrically isolated by forming an insulating perimeter around each membrane. This is illustrated in FIG. 14, where insulating frames 84 enclose each movable membrane. Electrical isolation may be formed either by removing the portions 84 of the silicon layer, by e.g. standard RIE, or these regions of the silicon layer may be rendered resistive by a heavy ion implant of e.g. protons. If the implant damage option is used to isolate the membranes, it may be performed prior to the release step of FIG. 13, i.e. while the structure is robust, thereby resulting in expected increased yield.

Figure 15:
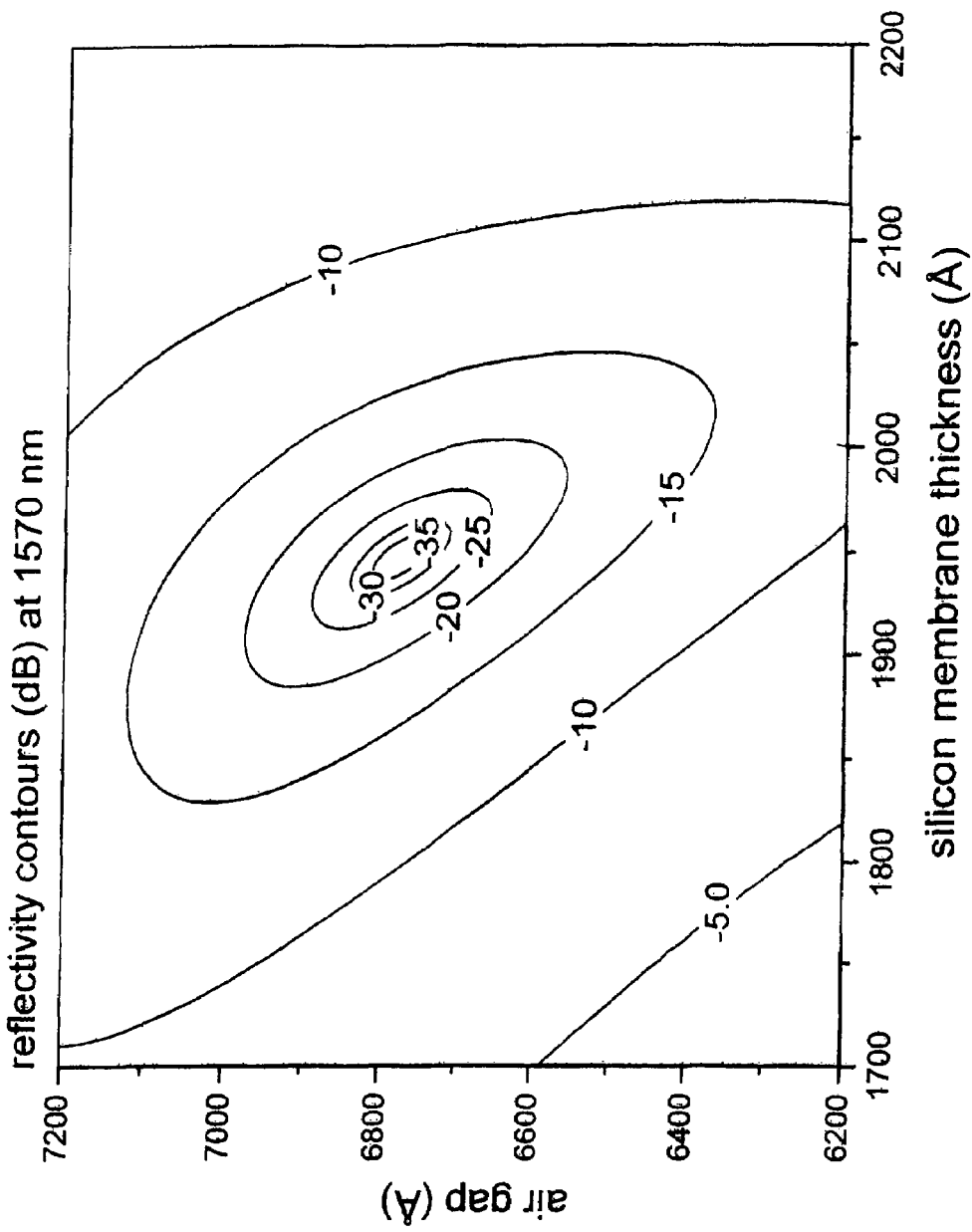
FIGS. 15 and 16 are plots of reflection in dB vs. wavelength showing the relationships between different membrane thicknesses and gap values.
Figure 16:
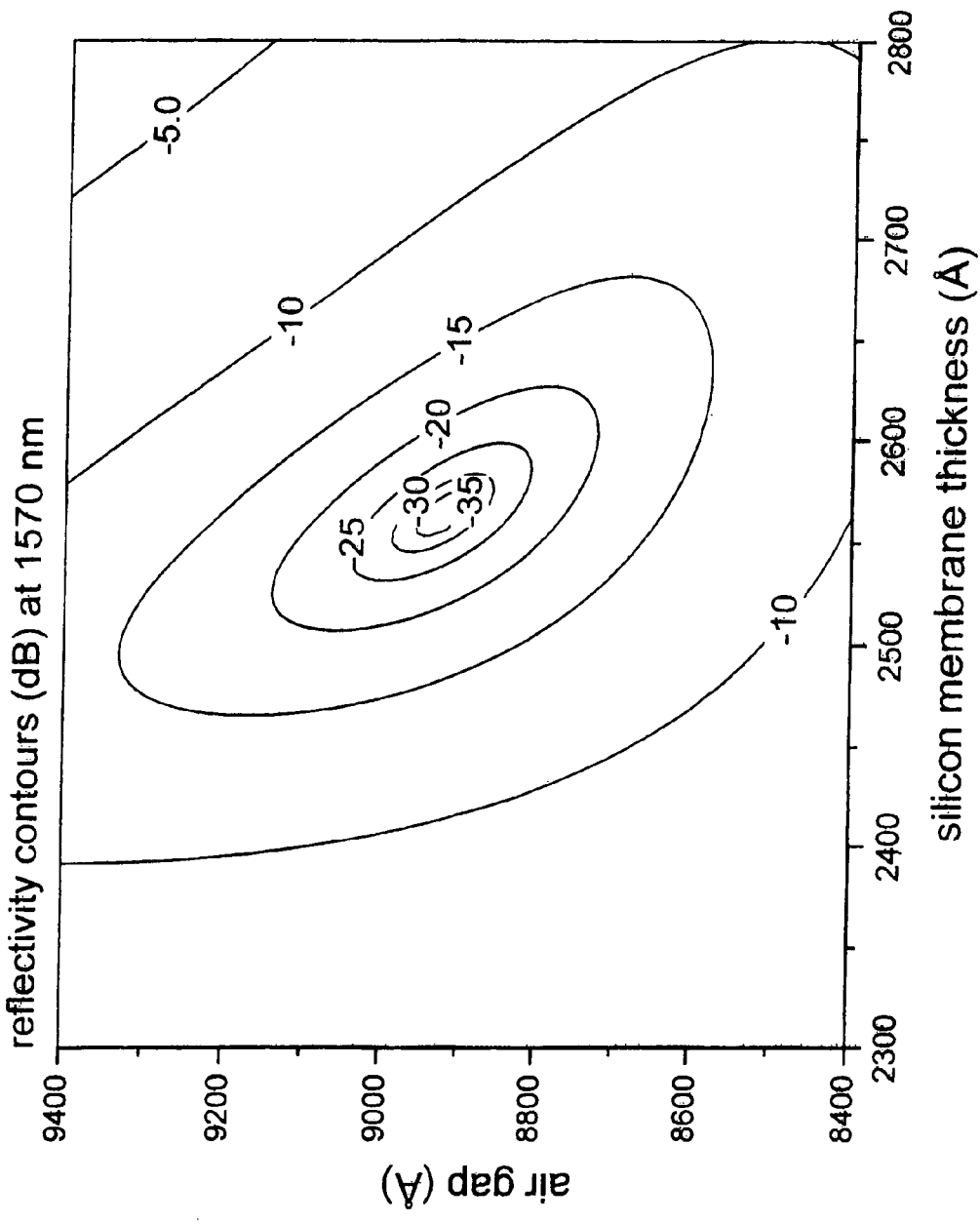

The effectiveness of the single crystal movable membrane of the invention was demonstrated by plotting reflectivity in dB vs. wavelength (over the 1530 to 1600 nm range of interest) for devices having different air gap values. Results are presented in FIGS. 15 and 16. FIG. 15 shows reflectivity for a 1950 Angstrom membrane, and FIG. 16 shows reflectivity for a 2550 Angstrom membrane. These results show that acceptable device contrast, e.g. using a 15 dB requirement, are easily obtained in these devices. Significantly, experience with these devices shows that curling of the thin movable membranes does not occur under normal conditions. Also, since the membrane is highly conductive relative to silicon nitride membranes, electrical charging of the membrane is avoided.

The plots of FIGS. 15 and 16, combined with other data and known practical manufacturing considerations, suggests a recommended range for the thickness of the movable silicon membrane of 1000 to 5000 Angstroms. A range for the air gap thickness, which is essentially the thickness of the $SiO_2$ layer in the SOI substrate, is 7000 to 15000 Angstroms. The air gap operating range, over which the membrane is caused to deflect in operation, will typically be in the range 1500 to 5000 Angstroms.

From the plan view of FIG. 14, it is evident that each of the movable membranes is defined by a pair of parallel slots 66 in the silicon layer, in combination with an insulating region 84 that completes a rectangular electrically isolated region around each membrane. The underlying portion of the $SiO_2$ layer shown by the dashed rectangle 82 has been etched away. The underlying oxide is shown as extending nearly to the edge of the pairs of parallel slots 66. It may extend just to the edge, or beyond the edge, as desired, as long as a major portion of the region beneath each pair of parallel slots is free of oxide. It will be understood that the individual MARS elements in this device have movable membranes that are essentially equivalent to those described in conjunction with FIGS. 3–5, with the movable membranes supported in this case by two support arms.

The optical wavelengths of most interest in current photonic devices are 1300 nm and 1500–1600 nm. These wavelengths correspond to spectral regions of ultra high transparency and resultant transmission efficiency in silica based transmission media. However, the invention described above is useful for any optical wavelength, e.g. 500–2000 nm with suitable adjustment of the device dimensions.

From earlier discussions, e.g. in connection with FIGS. 1 and 2, it is apparent that the devices described above are useful for optical switches where the optical beam is switched between an optimally reflecting to an optically anti-reflecting state, and it is anticipated that these devices will be used in commercial systems for that function. However, in the channel equalizer described above the individual devices operate as variable optical attenuators to equalize light intensity of multiple beams in the WDM signal. In such applications the device is electrooptically switched or adjusted most typically between states that are partially reflecting (or partially anti-reflecting).

The invention has been described in terms of a silicon substrate and silicon optoelectronic devices. It will occur to those skilled in the art that various forms of hybrid structures can also be used thus allowing flexibility in the choice of substrate material for the optoelectronic device. It is recognized that in the case of the MARS device, the electrical function of the device does not require a semiconductor substrate material and a wide variety of conductive materials for the device substrate are possible. Useful devices based on single crystal silicon movable membranes can also be envisioned where the intermediate insulating material of the device is a material other than silicon dioxide. This should be evident from the fact that the silicon dioxide layer in the structure used for the invention provides essentially a mechanical function. Thus materials such as $Si_3N_4$, $Al_2O_3$, TaO, TaN, TiN, $W_xN$, are all potentially useful candidates. However, it will also be understood that the use of SOI starting materials, as described in detail above, and in which both the substrate and the movable membrane are silicon, and the intermediate layer is $SiO_2$, is the preferred form of the invention.

Various additional modifications of the invention may be made by those skilled in the art. All variations that basically rely on the teachings through which this invention has advanced the art, or the equivalents of those variations, are properly considered within the scope of this invention.

The invention claimed is:

1. An electrooptic device comprising:
  a. an electrically conductive substrate having a surface $S_1$,
  b. a movable membrane having a top surface and a bottom surface $s_2$, the movable membrane comprising a single crystal silicon layer with a thickness in the range 1000–5000 Angstroms,
  c. a laser for directing light onto the movable membrane, the light having a wavelength $\lambda$,
  d. a support for positioning the movable membrane at a first position spaced from said substrate by an air gap $d_1$ between surface $s_1$ and $s_2$, and
  e. bias means for applying an electrical bias across the air gap to move the movable membrane from the first position to a second position spaced from said substrate by an air gap $d_2$ between surface $s_1$ and $s_2$, where $d_2$–$d_1$ is in the approximate range 1500 to 5000 angstroms and where the change from the first to the second position causes a change in the amount of light from said laser that is reflected from the movable membrane.

2. The device of claim 1 wherein the conductive substrate is a semiconductor.

3. The device of claim 2 wherein the conductive substrate is silicon.

4. The device of claim 1 wherein the laser has a wavelength $\lambda$ in the range 1500–1600 nm.

5. A method for switching light comprising:
  a. directing a beam of laser light with a wavelength $\lambda$ on a substrate,
  the substrate supporting a movable membrane spaced from said substrate, the movable membrane consisting of single crystal silicon with a thickness in the range 1000–5000 Angstroms and having, a support for positioning said membrane at a first position spaced from said substrate by an air gap $m\lambda/4$, where m is an even number, and a second position $d_1$ spaced from said substrate by an air gap $n\lambda/4$ and n is an odd number, and b. applying an electrical bias across said air gap to move said membrane from said first position to said second position $d_2$ where $d_2-d_1$ is in the approximate range 1500 to 5000 angstroms and where the change from the first to the second position changes the light that is reflected from the movable membrane from anti-reflecting to reflecting.

6. The method of claim 5 wherein said substrate is silicon.

7. The method of claim 5 wherein $\lambda$ is approximately 1.55 µm.

* * * * *